(12) United States Patent
Nakayama (10) Patent No.: US 10,857,952 B2
(45) Date of Patent: Dec. 8, 2020

(54) DETECTION APPARATUS AND VEHICLE (71) Applicant: HONDA MOTOR CO., LTD., Tokyo (JP)

(72) Inventor: Shingo Nakayama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/676,829

(22) Filed: Nov. 7, 2019

(65) Prior Publication Data
US 2020/0172020 A1 Jun. 4, 2020

(30) Foreign Application Priority Data
Dec. 4, 2018 (JP) .................. 2018-227444

(51) Int. Cl.
B60R 11/04 (2006.01)
B60R 19/48 (2006.01)
G01S 13/931 (2020.01)
G06K 9/00 (2006.01)
B60R 11/00 (2006.01)

(52) U.S. Cl.
CPC ............ B60R 11/04 (2013.01); B60R 19/483 (2013.01); G01S 13/931 (2013.01); G06K 9/00791 (2013.01); B60R 2011/004 (2013.01); B60R 2011/0096 (2013.01)

(58) Field of Classification Search
CPC ..... B60R 11/04; B60R 19/483; G01S 13/931; G06K 9/00791

USPC ......................................................... 340/435
See application file for complete search history.

(56) References Cited

U.S. PATENT DOCUMENTS

| | | | |
|---|---|---|---|
| 9,038,876 B2* | 5/2015 | Aleem | B60R 21/00 224/489 |
| 9,804,261 B2 | 10/2017 | Dechoux | |
| 9,956,993 B1* | 5/2018 | Klop | B60R 19/483 |
| 2008/0315050 A1* | 12/2008 | Buckley | B60R 19/483 248/205.1 |
| 2014/0368375 A1* | 12/2014 | Baftiu | H01Q 17/00 342/70 |
| 2016/0291151 A1 | 10/2016 | Dechoux | |
| 2020/0180518 A1* | 6/2020 | Okamura | B60R 11/00 |

FOREIGN PATENT DOCUMENTS

| | | |
|---|---|---|
| JP | 2015-219721 A | 12/2015 |
| WO | 2015/072289 A1 | 3/2017 |

* cited by examiner

Primary Examiner — John A Tweel, Jr.
(74) Attorney, Agent, or Firm — Thomas | Horstemeyer, LLP (57) ABSTRACT

A detection apparatus that includes a detection unit configured to detect a peripheral environment of a vehicle and a bracket configured to attach the detection unit to a vehicle body, wherein in a state in which the bracket is attached to the vehicle body with the detection unit, the detection unit includes, on a lower end portion, a connector portion configured to be able to output a detection signal indicating the peripheral environment, and the bracket includes a pair of supporting portions configured to support the detection unit from the lower side on both sides of the connector portion and a bridge portion arranged astride the pair of supporting portions so as not to interfere with the connector portion.

6 Claims, 7 Drawing Sheets

DETECTION APPARATUS AND VEHICLE

CROSS-REFERENCE TO RELATED APPLICATION

This application claims priority to and the benefit of Japanese Patent Application No. 2018-227444 filed on Dec. 4, 2018, the entire disclosure of which is incorporated herein by reference.

BACKGROUND OF THE INVENTION

Field of the Invention

The present invention mainly relates to an onboard detection apparatus.

Description of the Related Art

Among vehicles such as a four-wheeled vehicle and the like, there is proposed a vehicle for implementing automated driving in which the driving operation is performed partially or entirely by an ECU (electronic control unit) (see Japanese Patent Laid-Open No. 2015-219721). Automated driving is performed based on a detection result obtained about the peripheral environment of a vehicle, and a detection apparatus such as a radar or the like is used to detect the peripheral environment (see International Publication No. 2015/072289).

In the manufacture of a vehicle, a detection apparatus to be installed on a vehicle body is required to be easy to handle for a user (for example, a manufacturer, a distributor, or the like).

SUMMARY OF THE INVENTION

The present invention provides a novel structure of an onboard detection apparatus which is easy to handle for a user.

One of the aspects of the present invention provides a detection apparatus that includes a detection unit configured to detect a peripheral environment of a vehicle and a bracket configured to attach the detection unit to a vehicle body, wherein in a state in which the bracket is attached to the vehicle body with the detection unit, the detection unit includes, on a lower end portion, a connector portion configured to be able to output a detection signal indicating the peripheral environment, and the bracket includes a pair of supporting portions configured to support the detection unit from the lower side on both sides of the connector portion and a bridge portion arranged astride the pair of supporting portions so as not to interfere with the connector portion.

Further features of the present invention will become apparent from the following description of exemplary embodiments with reference to the attached drawings.

DESCRIPTION OF THE EMBODIMENTS

An embodiment of the present invention will be described hereinafter with reference to the accompanying drawings. Note that the drawings are schematic views showing structures or arrangements according to the embodiments, and the dimensions of members shown in the drawings do not necessarily reflect those of actual practice. In addition, the same reference numerals denote the same members or the same constituent elements in the drawings, and a description of repetitive contents can be omitted.

Figure 1A:
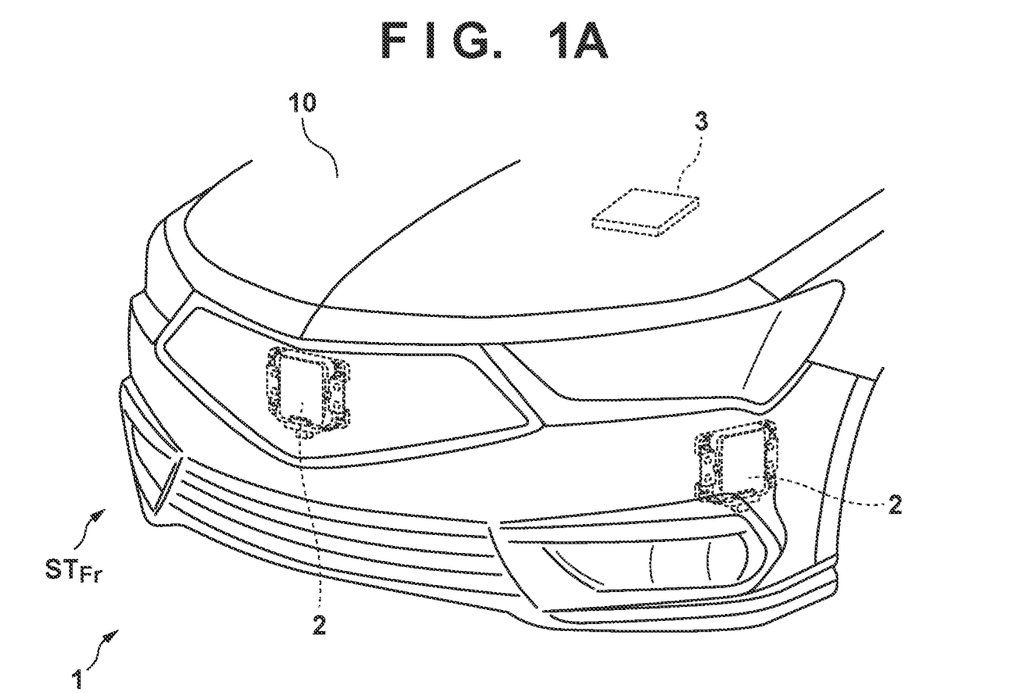
FIG. 1A is a perspective view for explaining a part of the structure of a vehicle according to an embodiment.
Figure 1B:
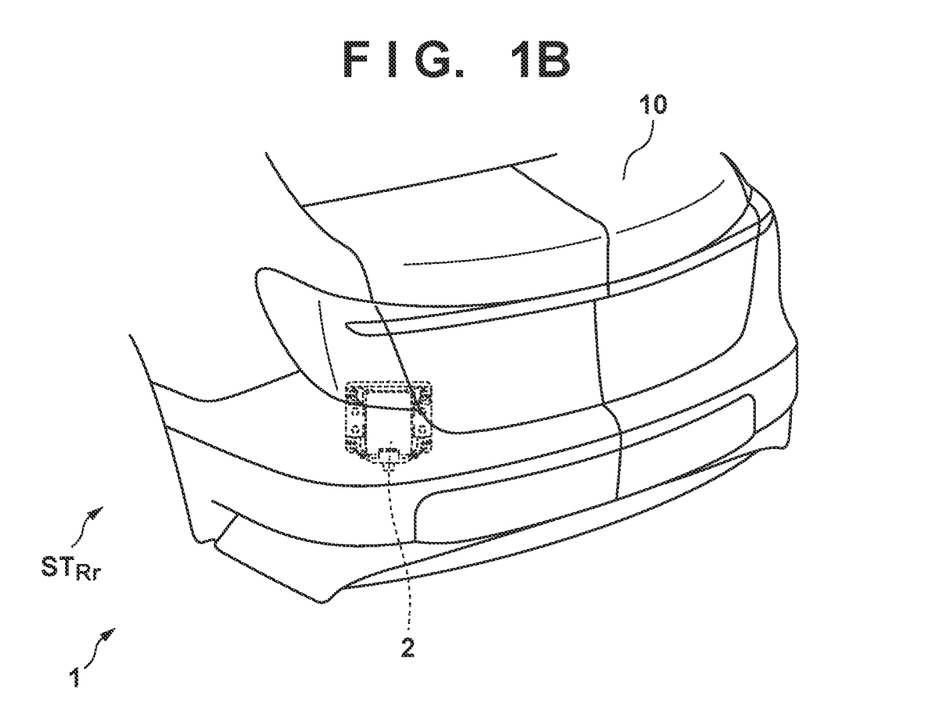
FIG. 1B is a perspective view for explaining a part of the structure of the vehicle according to the embodiment.

FIG. 1A is a perspective view of a front structure $ST_{Fr}$ of a vehicle 1 according to an embodiment. FIG. 1B is a perspective view of a rear structure $ST_{Rr}$ of the vehicle 1. The vehicle 1 includes a plurality of detection apparatuses 2 at a plurality of positions such as the front portion, the rear portion, the side portions, and the like of a vehicle body 10. For example, several detection apparatuses 2 are arranged at the front portion and front side portions of the vehicle body 10 as shown in FIG. 1A and at rear side portions of the vehicle body 10 as shown in FIG. 1B. Note that although a four-wheeled vehicle is assumed to be the vehicle 1 in this embodiment, it may be another vehicle such as a straddle-type two-wheeled vehicle or the like.

Each detection apparatus 2 is formed to be capable of detecting or monitoring the peripheral environment of the vehicle 1. The peripheral environment mentioned here refers to information, which is obtained from outside the vehicle and needed for an appropriate driving operation, for example, the presence/absence of an object (a pedestrian, another vehicle, an obstacle, or the like) in the periphery of the vehicle 1, the extending direction of a lane (for example, a region demarcated by division lines of a predetermined color) on which the vehicle is traveling, the color indicated by a traffic light, and the like. Each detection apparatus 2 may also be expressed as a monitoring apparatus, a sensor device, or the like.

The vehicle 1 further includes an ECU (electronic control unit) 3. The ECU 3 includes, for example, a CPU (central processing unit), a memory, an external communication interface, and the like, and controls the traveling of the vehicle 1 based a result of arithmetic processing executed according to a predetermined program. In this embodiment, the ECU 3 can execute automated driving of the vehicle 1 based on the detection results obtained by the detection apparatuses 2 described above. In this case, automated driving refers to a state in which the driving operation (acceleration, braking, and steering) is partially or entirely performed by the ECU 3 instead of a driver. That is, the concept of automated driving includes a state in which the driving operation is entirely performed by the ECU 3 (so-called fully automated driving) and a state in which the driving operation is only partially performed by the ECU 3 (so-called driving assistance). Examples of driving assistance are a vehicle speed control (auto cruise control) function, a following distance control (adaptive cruise control) function, a lane departure prevention assistance (lane keep assist) function, a collision avoidance support function, and the like.

Although a radar (millimeter wave radar) is a typical example of the detection apparatus 2, the present invention is not limited to this. Various kinds of image capturing apparatuses or distance measurement devices such as a camera, LiDAR (Light Detection And Ranging), and the like can be used as the detection apparatuses 2. Assume that each detection apparatus 2 is a radar in the following explanation.

Figure 2A:
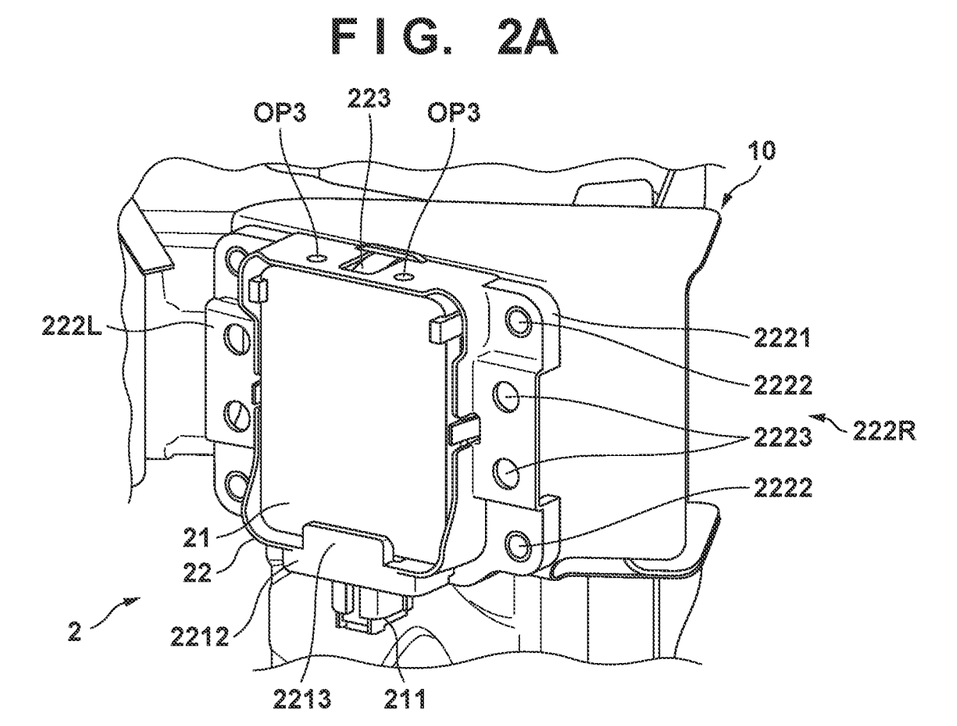
FIG. 2A is a view for explaining an example of a mode of attachment of a detection apparatus.
Figure 2B:
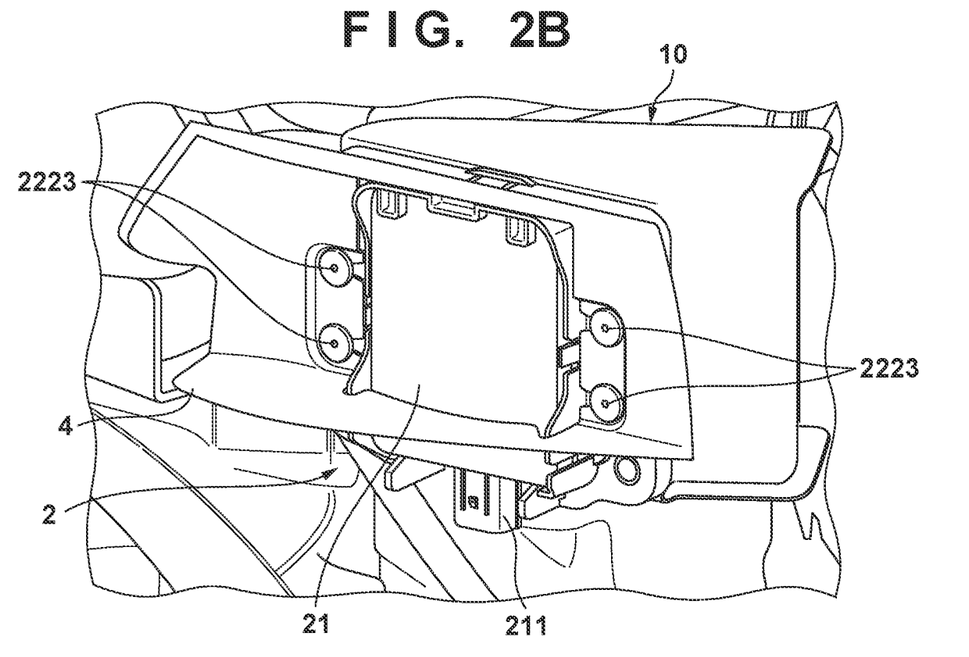
FIG. 2B is a view for explaining an example of the mode of attachment of the detection apparatus.

FIG. 2A is a perspective view showing a mode of installation of each detection apparatus 2 on the vehicle body 10. Each detection apparatus 2 includes a detection unit 21 which is the main body of the radar and a bracket 22 for attaching the detection unit 21 to the vehicle body 10. Although details will be described later, the bracket 22 is formed so that the detection unit 21 can be attached/detached. The installation of the detection apparatus 2 on the vehicle body 10 is implemented by attaching, to the vehicle body 10, the bracket 22 that has been attached with the detection unit 21, and another vehicle component 4 may be further attached to the detection apparatus 2 as shown in FIG. 2B. The vehicle component 4 can be formed so as not to hinder the detection performance of the detection apparatus 2, and is attached to the vehicle body 10 so as to be engaged with a part of the bracket 22 while exposing the detection unit 21 in this case.

In the following explanation, although expressions such as upper, lower, left, right, and the like are sometimes used to describe the positional relationship between the components and the parts of the detection apparatus 2, these expressions indicate the relative positions of the detection apparatus 2 from a front view (see FIGS. 2A and 2B) in a state in which the detection apparatus is attached to the vehicle body 10.

Figure 3A:
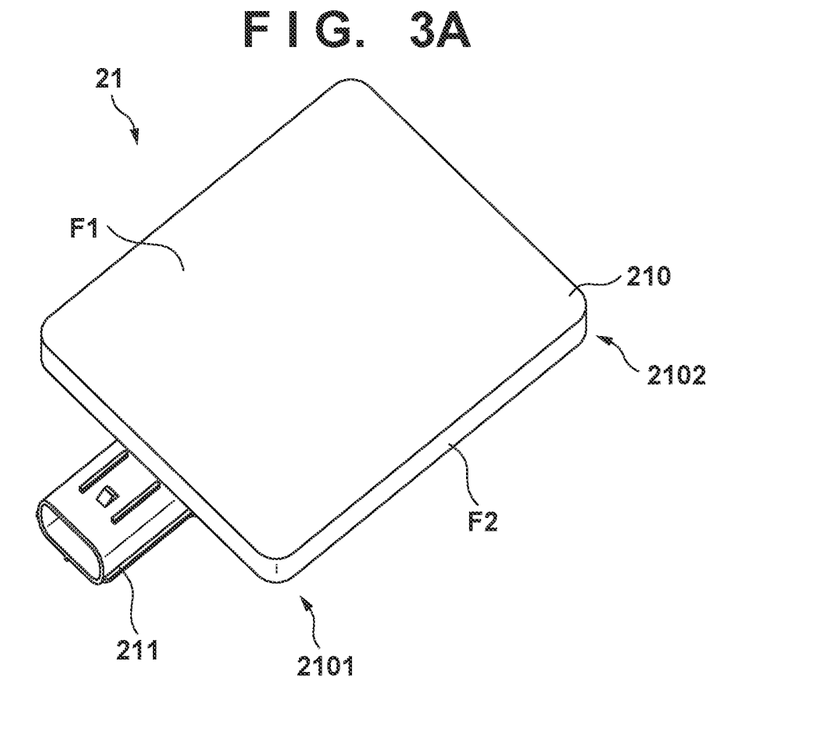
FIG. 3A is a perspective view for explaining the structure of a radar as an example of a detection unit.
Figure 3B:
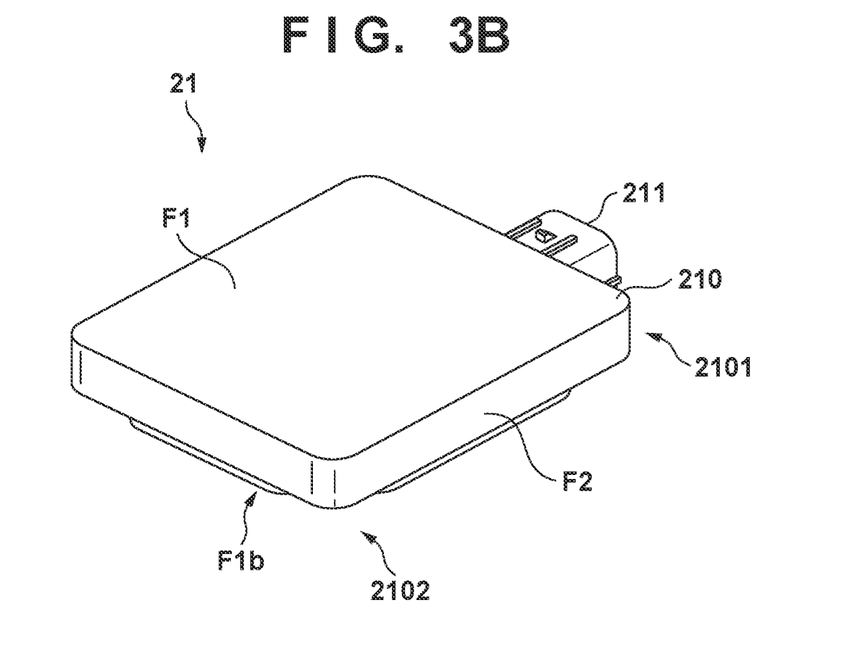
FIG. 3B is a perspective view for explaining the structure of the radar as an example of the detection unit.

FIG. 3A is a perspective view showing the structure of the detection unit 21. FIG. 3B is a perspective view showing the structure of the detection unit 21 and is a perspective view (that is, a perspective view from the side of another end 2102) obtained from a viewpoint different from that of FIG. 3A. The detection unit 21 includes a main body portion 210 and a connector portion 211. The main body portion 210 includes several electronic components for implementing a radar function, and the connector portion 211 is arranged so that an electrical signal obtained in the main body portion 210 can be output to an external unit (the ECU 3 in this embodiment).

The main body portion 210 has a detection surface F1 on its front surface and further has a reference surface F2 on its side surfaces. The main body portion 210 emits millimeter waves from the detection surface F1 toward the periphery of the vehicle 1 (outside the vehicle body 10), and uses the detection surface F1 to detect the reflected waves from an object or the like. Although only partially shown in FIGS. 2A and 2B, the reference surface F2 is set so as to surround the side surfaces (the upper surface, the right side surface, lower surface, and the left side surface of the main body portion in a state in which the detection unit 21 is attached to the vehicle body 10) of the main body portion 210. Although details will be described later, the reference surface F2 is used as a reference for specifying the detection direction of the detection unit 21, and the detection surface F1 is arranged with a predetermined orientation with respect to the reference surface F2. Note that a surface F1*b* is the back surface on the opposite side of the detection surface F1 (see FIG. 3B).

The main body portion 210 includes an end 2101 and the other end 2102 on the opposite side of the end 2101. The connector portion 211 is arranged at the end 2101. A wiring harness (not shown) is electrically connected to the connector portion 211. The connector portion 211 can output, as a detection signal indicating the peripheral environment of the vehicle 1, an electrical signal indicating the detection result by the detection surface F1 of the main body portion 210 to the ECU 3 via the wiring harness described above. In this embodiment, as shown in FIGS. 2A and 2B, the detection apparatus 2 will be fixed to the vehicle body so that the connector portion 211 will be positioned on the lower side. Hence, the end 2101 may be expressed as the lower end, and the other end 2102 may be expressed as the upper end. Positioning the connector portion 211 on the lower side will allow the wiring harness (not shown) used to connect the connector portion 211 and the ECU 3 to be arranged comparatively easily (that is, without complicating the structure of the vehicle body or hindering the arrangement of other vehicle components).

Note that the main body portion 210 includes, as the electronic components to be included, for example, a processing unit that processes the detection result obtained by the detection surface F1 and a signal generation unit that generates a detection signal based on the processing result obtained by the processing unit. The signal generation unit is positioned closer to the side of the surface F1*b* than the processing unit, and the connector portion 211 which outputs the detection signal generated by the signal generation unit is also arranged closer to the side of the surface F1*b* than the reference surface F2.

Figure 4:
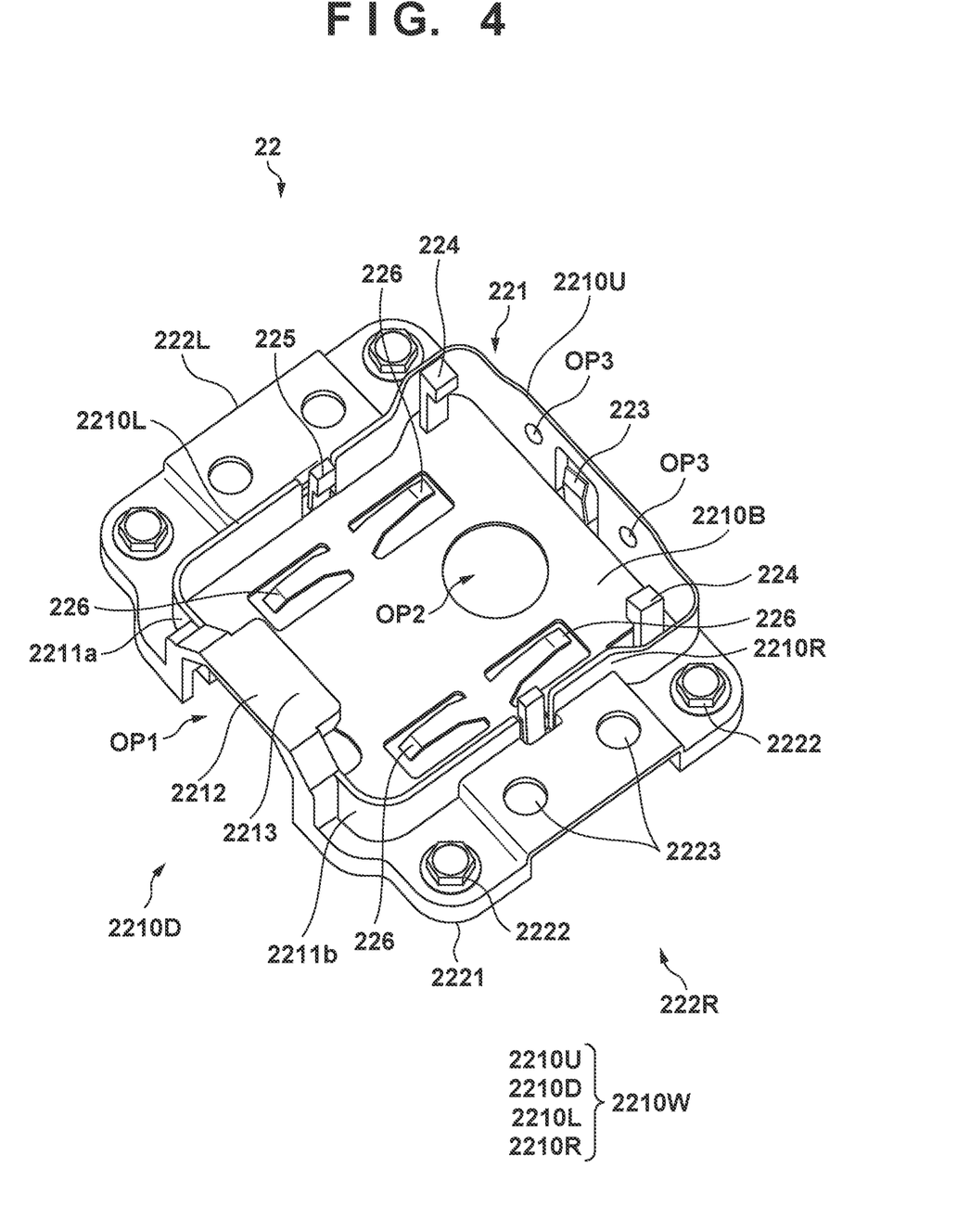
FIG. 4 is a perspective view for explaining the structure of a bracket.

FIG. 4 is a perspective view showing the structure of the bracket 22 in a state in which the detection unit 21 is not attached. The bracket 22 includes a storage portion 221 that can store the detection unit 21 and a pair of attachment portions 222L and 222R.

The storage portion 221 includes a bottom portion 2210B and side wall portions 2210W. The bottom portion 2210B is a portion which is to be positioned on the side of the vehicle body 10 and faces the back surface F1*b* of the detection unit 21 when the detection unit 21 is stored. The side wall portions 2210W are arranged to extend outside the vehicle body 10 from the bottom portion 2210B, and include an upper side wall portion 2210U, a lower side wall portion 2210D, a left side wall portion 2210L, and a right side wall portion 2210R that surround the side surfaces of the detection unit 21 when the detection unit 21 is stored.

A plurality of opening portions OP1 to OP3 are also arranged in the storage portion 221. The opening portion OP1 is arranged in the lower side wall portion 2210D, and the connector portion 211 of the detection unit 21 can be inserted through this opening portion OP1. The opening portion OP2 is arranged in the bottom portion 2210B and can expose a part of the back surface F1*b* of the detection unit 21. The opening portions OP3 are arranged as a pair in the upper side wall portion 2210U and can be used when a predetermined evaluation of the detection unit 21 is to be performed. Note that the opening portion OP1 and the like may be expressed as openings or holes. The details of these portions will be described later.

In addition, the lower side wall portion 2210D includes a pair of support portions 2211a and 2211b, a bridge portion 2212, and an extending portion 2213 in the peripheral portion of the opening portion OP1 described above. The pair of support portions 2211a and 2211b supports the detection unit 21 from its lower side when the detection unit 21 is stored in the storage portion 221. The bridge portion 2212 is arranged astride the pair of support portions 2211a and 2211b and improves the strength of the pair of support portions 2211a and 2211b. The extending portion 2213 allows the detection unit 21 stored in the storage portion 221 to be held appropriately. The details of these portions will also be described later.

The bracket 22 further includes a pressing portion 223, locking portions 224, pressing portions 225, and biasing portions 226, and these portions are arranged separately in several parts of the storage portion 221. The pressing portion 223 is arranged between the above-described pair of opening portions OP3 in the upper side wall portion 2210U. The locking portions 224 extend from the bottom portion 2210B, and one locking portion is at a corner portion formed by the upper side wall portion 2210U and the left side wall portion 2210L, and the other locking portion is at the corner portion formed by the upper side wall portion 2210U and the right side wall portion 2210R. Each pressing portion 225 is arranged at the corresponding one of the left side wall portion 2210L and the right side wall portion 2210R. A total of four biasing portions 226 are arranged in the bottom portion 2210B so as to be symmetrical in the upper and lower directions on both sides of the opening portion OP2.

The pressing portion 223, the locking portions 224, and the pressing portions 225 will firmly fix the detection unit 21 when the detection unit 21 is stored in the storage portion 221. The biasing portions 226 will bias, from the side of the bottom portion 2210B, the above-described detection unit 21 stored in the storage portion 221 to make the detection unit 21 abut against the locking portions 224 to fix the position of the detection unit 21 in the storage portion 221. The biasing force, from the side of the bottom portion 2210B, of the biasing portions 226 can aid the removal of the detection unit 21 from the storage portion 221.

The pair of attachment portions 222L and 222R implements installation of the detection apparatus 2 on the vehicle body 10 by the attachment of the bracket 22, and each attachment portion is arranged to extend laterally from the storage portion 221 described above. The attachment portion 222L extends from the left side wall portion 2210L toward the outside of the storage portion 221 in a direction parallel to the detection surface F1, and the attachment portion 222R extends from the right side wall portion 2210R toward the outside of the storage portion 221 in a direction parallel to the detection surface F1. Such a structure can reduce the thickness (height) of the whole detection apparatus 2 and make the detection apparatus 2 comparatively compact. As a result, for example, the detection apparatus 2 can be easily installed in a desired position on the vehicle body 10. Note that the attachment portion 222R may also be expressed as a right-side attachment portion, and the attachment portion 222L may also be expressed as a left-side attachment portion.

For example, when attention is focused on the attachment portion 222R (see FIG. 4), it can be seen that the attachment portion 222R includes an extending portion 2221 and a plurality of holes 2222 and 2223 provided on this extending portion 2221. The holes 2222 are bracket attachment holes for attaching the bracket 22 itself to the vehicle body 10. The holes 2223 are other component attachment holes for attaching other components to the bracket 22, and allow, for example, the vehicle component 4 (which has been described with reference to FIG. 2B) to be attached to the bracket 22. This arrangement also applies to the attachment portion 222L in a similar manner.

Figure 5A:
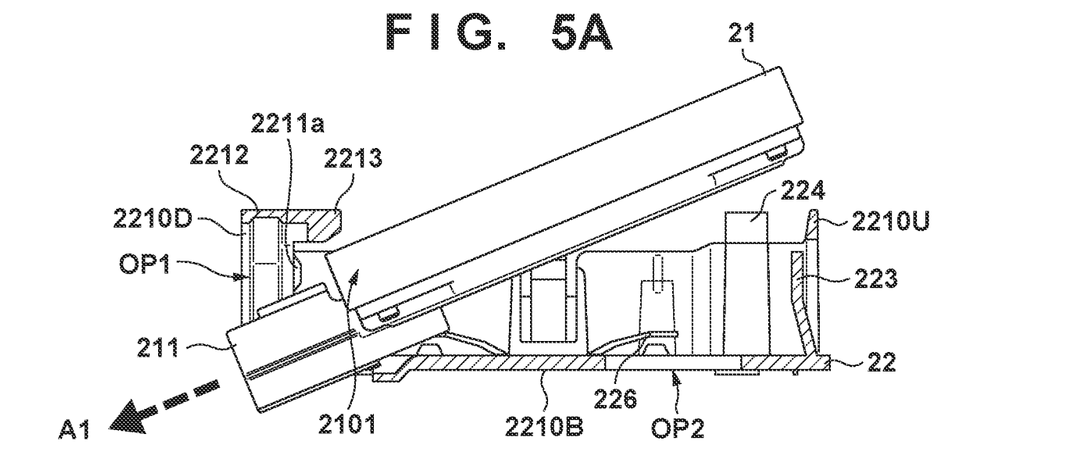
FIG. 5A is a side view for explaining a mode of attachment of the detection unit to the bracket.
Figure 5B:
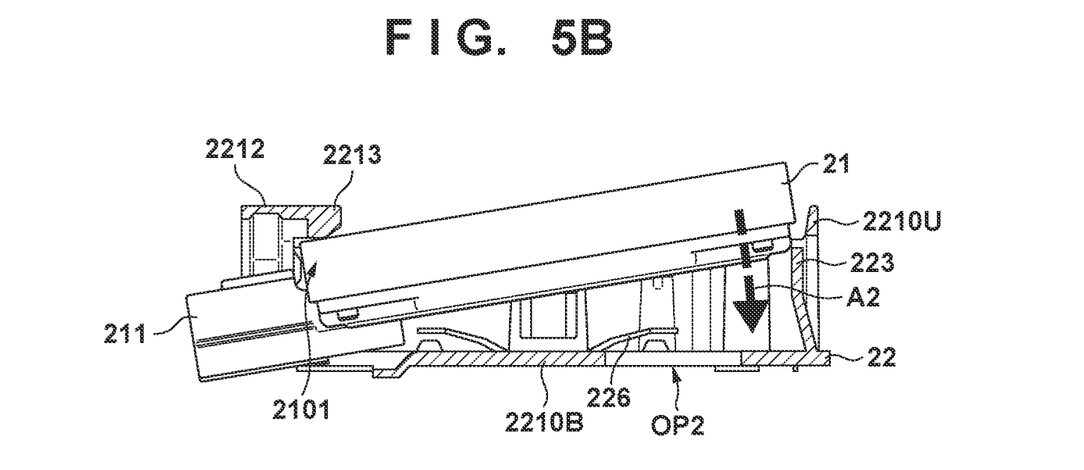
FIG. 5B is a side view for explaining the mode of attachment of the detection unit to the bracket.
Figure 5C:
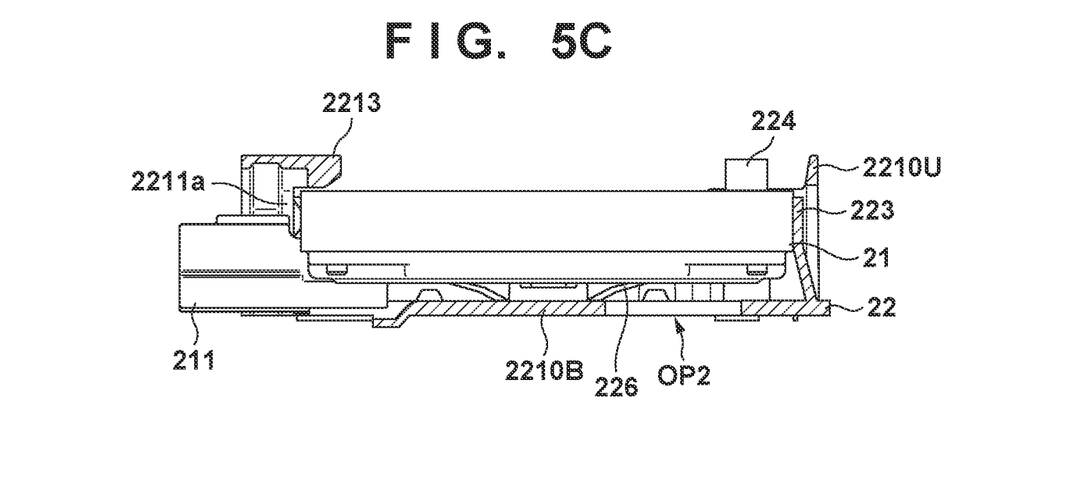
FIG. 5C is a side view for explaining the mode of attachment of the detection unit to the bracket.

FIGS. 5A to 5C are side views for explaining the procedure of the attachment of the detection unit 21 to the bracket 22. First, as shown by an arrow A1 in FIG. 5A, the connector portion 211 of the detection unit 21 is inserted in the opening portion OP1 of the bracket 22. Next, after the end 2101 of the main body portion 210 is abutted against the support portion 2211a (and the support portion 2211b), the main body portion 210 is pivoted about the end 2101 in a manner shown by an arrow A2 in FIG. 5B. As a result, the detection unit 21 is attached to the bracket 22 as shown in FIG. 5C.

The above-described attachment of the detection unit 21 is completed when the locking portions 224 lock the main body portion 210 laterally. The pressing portion 223 will press down, from above, on the main body portion 210 in this state. The support portion 2211a (and the support portion 2211b) that supports the detection unit 21 from the lower side forms a convex-shaped abutment portion which abuts the end 2101, and acts as load-bearing portion which bears the load of the detection unit 21. Hence, it may also be said that the pressing portion 223 will sandwich, together with the support portion 2211a (and the support portion 2211b), the main body portion 210 in the lower and upper directions. Additionally, in the attachment state described above, the pair of left and right pressing portions 225 (see FIG. 4) arranged in left side wall portion 2210L and the right side wall portion 2210R, respectively, will further press the main body portion 210 from both sides (sandwich the main body portion in the left and right directions).

Although the biasing portions 226 will bias the main body portion 210 from the side of the back surface F1b in the attachment state described above, the main body portion 210 will be locked by the locking portions 224 and sandwiched by the locking portions 224 and the biasing portions 226 as a result. In addition to this, the main body portion 210 will be further pressed and sandwiched by the pressing portions 223 and 225. Therefore, the detection unit 21 will be firmly fixed into the storage portion 221.

When the detection unit 21 is to be removed from the bracket 22, the detection unit 21 can be removed by performing a procedure which is in reverse of that described in FIGS. 5A to 5C after the lock of the locking portions 224 has been released. That is, the detection unit 21 can be detached from/attached to the bracket 22 by pivoting about the end 2101 in a state in which the end 2101 is abutting the bracket 22.

The extending portion 2213 extends upward from the bridge portion 2212 so as to restrict the movement of the detection unit 21 in a direction away from the bracket 22. This will prevent a state in which the detection unit 21 will be dropped by mishandling the detection unit 21 at the time of attachment/detachment.

Figure 6A:
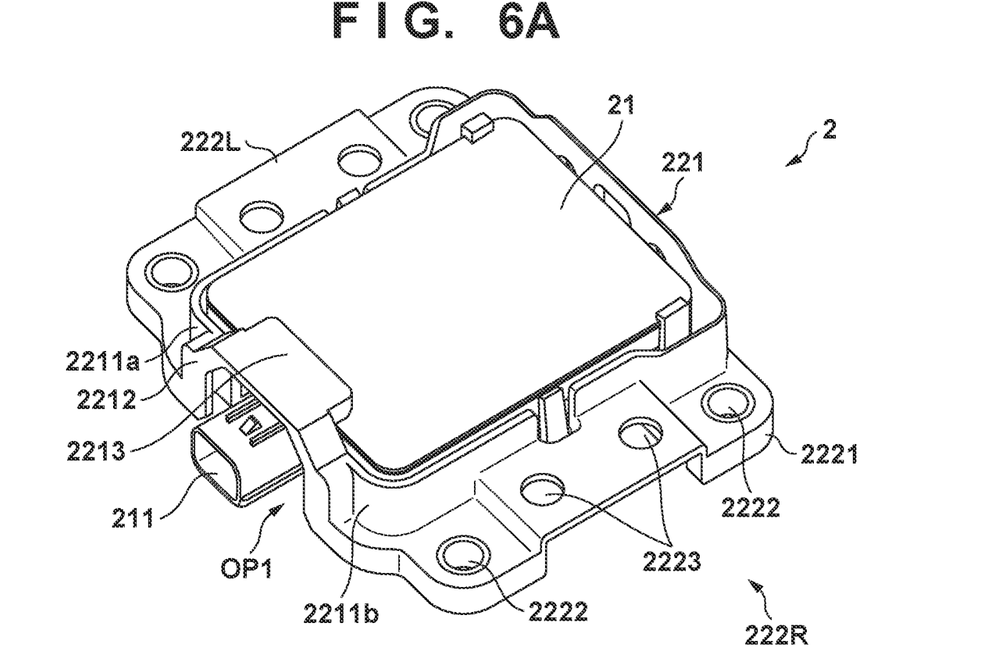
FIG. 6A is a perspective view from a given viewpoint for explaining the structure of the detection apparatus.

FIG. 6A is a perspective view showing the structure of the detection apparatus 2 obtained when the detection unit 21 is attached to the bracket 22. As described above, a state in which the detection unit 21 is attached to the bracket 22 is a state in which the connector portion 211 has been inserted through the opening portion OP1 of the lower side wall portion 2210D. Hence, the pair of support portions 2211a and 2211*b* will support the detection unit 21 from its lower side on both sides of the connector portion 211.

In this case, the arrangement of the opening portion OP1 in the lower side wall portion 2210D may decrease the strength of the lower side wall portion 2210D compared to those of the other wall portions 2210U, 2210L, and 2210R. Hence, the bridge portion 2212 is arranged on the lower side wall portion 2210D. The bridge portion 2212 is arranged astride the pair of support portions 2211*a* and 2211*b* (so as to extend along a part of the edge of the opening portion OP1) so as not to interfere with the connector portion 211 which is inserted through the opening portion OP1. Since the connector portion 211 is arranged on the side of the surface F1*b* in the relationship with the detection unit 21, the bridge portion 2212 is arranged to have an arch shape so as to bypass the connector portion from the side of the surface F1*b* to the side of the detection surface F1 in the periphery of the opening portion OP1. Such a structure will allow the pair of support portions 2211*a* and 2211*b* to appropriately support the detection unit 21 from both sides of the connector portion 211 and can suppress the degradation of the strength of the pair of support portions 2211*a* and 2211*b*.

In this embodiment, as shown in FIG. 6A, the bridge portion 2212 is arranged so as to mutually connect the flanges which are extending from the pair of the attachment portions 222L and 222R toward the side of the opening portion OP1. Such a structure can appropriately improve the strength of the lower side wall portion 2210D in which the opening portion OP1 is arranged.

Figure 6B:
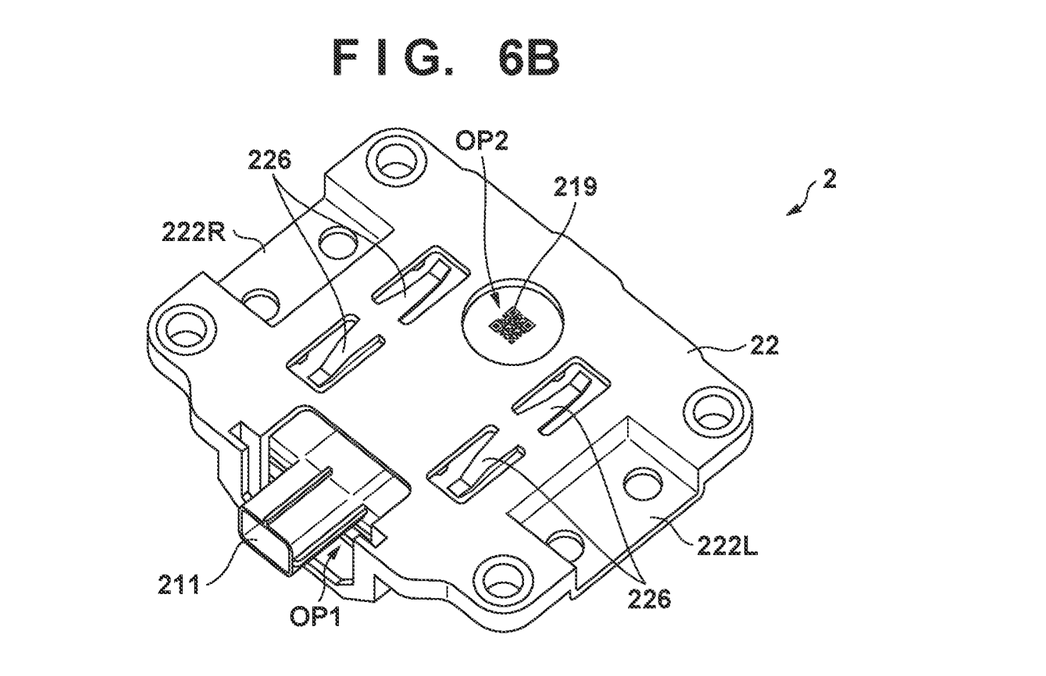
FIG. 6B is a perspective view from the given viewpoint for explaining the structure of the detection apparatus.

FIG. 6B is a perspective view showing the structure of the detection apparatus 2 and is a perspective view (that is, a perspective view from the side of the vehicle body 10) from a viewpoint different from that of FIG. 6A. As described above, the opening portion OP2 is provided on the bottom portion 2210B, and this opening portion OP2 exposes a part of the back surface F1*b* of the detection unit 21. An identifier 219 is added to the back surface F1*b* of the detection unit 21, and the above-described opening portion OP2 also exposes this identifier 219. Such a structure allows the individual information of the detection unit 21 to be identified even in a state in which the detection unit 21 is attached to the bracket 22. Hence, at the time of the manufacture of the vehicle 1, the user such as the manufacturer can handle the detection apparatus 2 in a state in which the detection unit 21 has been attached to the bracket 22. Note that it is sufficient for the identifier 219 to be an identifier which allows the individual information of the detection unit 21 to be identified, and a QR code® is used as the identifier in this embodiment. Alternatively or additionally, however, characters, a number, a symbol, a figure, or a combination of these items may be used as the identifier.

The opening portion OP2 described above can also be used when the detection unit 21 is to be removed from the bracket 22. The opening portion OP2 is preferably arranged to be of a size in which at least a finger can be partially inserted. As described above, when the detection unit 21 is to be removed, a procedure which is in reverse of that described in FIGS. 5A to 5C can be performed after the lock of the locking portions 224 has been released. According to the structure described above, at the time of the removal of the detection unit 21, a finger can be inserted into this opening portion OP2 to press the detection unit 21 from the side of the back surface F1*b*. In addition to this, the biasing portions 226 can bias the detection unit 21 from the back surface F1*b* to support the above-described pressing by the finger. As a result, the detection unit 21 will be pressed out from the bracket 22. Hence, according to the structure described above, it becomes comparatively easy to remove the detection unit 21 from the bracket 22.

It is preferable for the opening portion OP2 to be circular as shown in FIGS. 4 and 6B and to have, for example, a size (diameter) equal to or more than 1 cm. As a result, it will become easy to place the finger into the opening portion OP2, and the detection unit 21 can be pressed easily.

In this embodiment, the opening portion OP2 is positioned closer to the other end 2102 than the end 2101 of the detection unit 21. Since this will set the fulcrum on the side of the end 2101 and the point of force on the side of the other end 2102 when the detection unit 21 is to be removed from the bracket 22, the force required to remove the detection unit 21 need not increase more than necessary. Hence, it can implement the removal of the detection unit 21 comparatively easily. In addition, since the connector portion 211 is connected to the end 2101, the detection unit 21 can be removed without the connector portion 211 interfering with the bracket 22 at the time of the removal.

Referring again to FIG. 2A, it can be seen that the detection apparatus 2 is installed on the vehicle body 10 by fastening the bracket 22 to the vehicle body 10 by threadably engaging predetermined fastening members (screws or the like) to the holes 2222 of the attachment portions 222L and 222R. Although, in many cases, the bracket 22 is fastened to the vehicle body 10 in a state in which the detection unit 21 has been attached to the bracket, the detection unit 21 may be attached to the bracket 22 after the bracket 22 has been fastened to the vehicle body 10. The vehicle component 4 described above may also be concomitantly attached to the vehicle body so as to partially overlap the detection apparatus 2 in a manner shown in FIG. 2B. In this case, the vehicle component 4 can be fastened to the bracket 22 and the vehicle body 10 by threadably engaging predetermined fastening members (screws or the like) to the holes 2223. Note that after the detection apparatus 2 is installed on the vehicle body 10, a predetermined wiring harness can be electrically connected to the connector portion 211.

Figure 7:
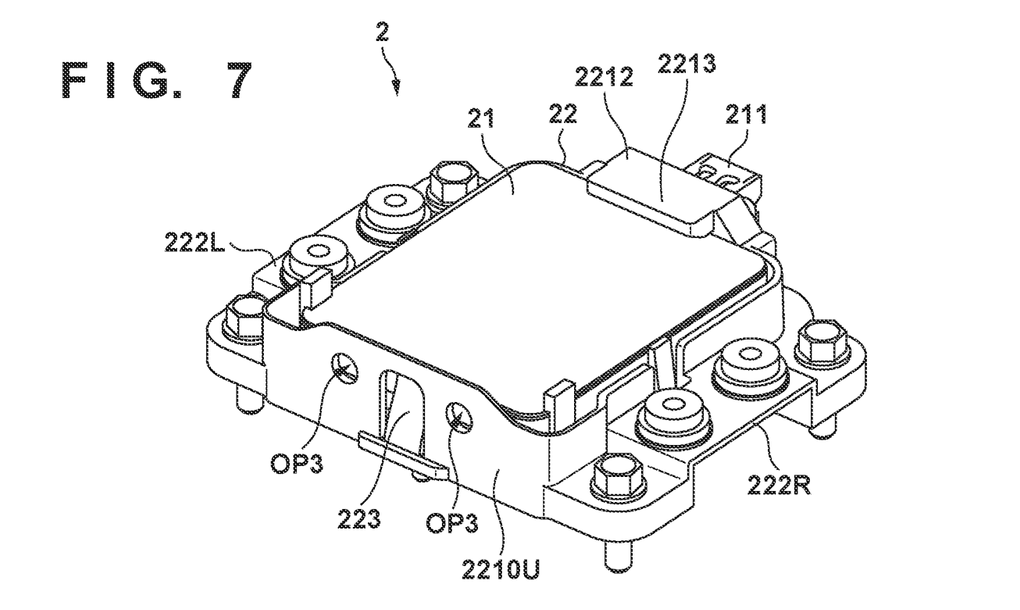
FIG. 7 is a perspective view from another viewpoint for explaining the structure of the detection apparatus.

FIG. 7 is a perspective view showing the structure of the detection apparatus 2 and is a perspective view (that is, a perspective view from the side of the upper side wall portion 2210U) obtained from a viewpoint different from those of FIGS. 6A and 6B. In this case, in relation to the detection apparatus 2 installed on the vehicle body 10, since the detection unit 21 will be attached to the vehicle body 10 via the bracket 22, the orientation evaluation of the detection unit 21 with respect to a horizontal plane can be required to specify the detection direction of the detection unit 21. Although it has been already described with reference to FIG. 4, the pair of opening portions OP3 is arranged in the upper side wall portion 2210U as also shown in FIG. 7. These opening portions OP3 are arranged at positions that expose the reference surface F2 (see FIG. 3A or the like) on the side surface of the main body portion 210, and can be used to evaluate the above-described orientation of the detection unit 21. As a result, the detection direction of the detection unit 21 can be evaluated. The above-described orientation with respect to the horizontal plane may be simply expressed as "orientation" in the explanation hereinafter.

Although this evaluation is assumed to be performed by using an evaluation jig and a level in this embodiment, the evaluation may also be performed based on the detection range, the width, the center axis, the detection distance, and the like of the detection unit 21 as another embodiment. The above-described evaluation of the detection unit 21 may also be expressed as detection direction evaluation, orientation evaluation, directivity evaluation, or the like.

Figure 8A:
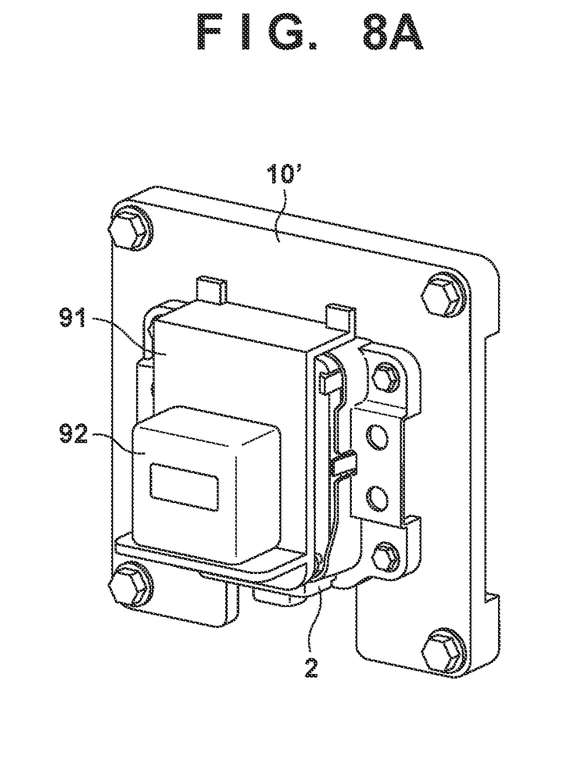
FIG. 8A is a view for explaining a mode of evaluation of a detection direction of the detection unit.
Figure 8B:
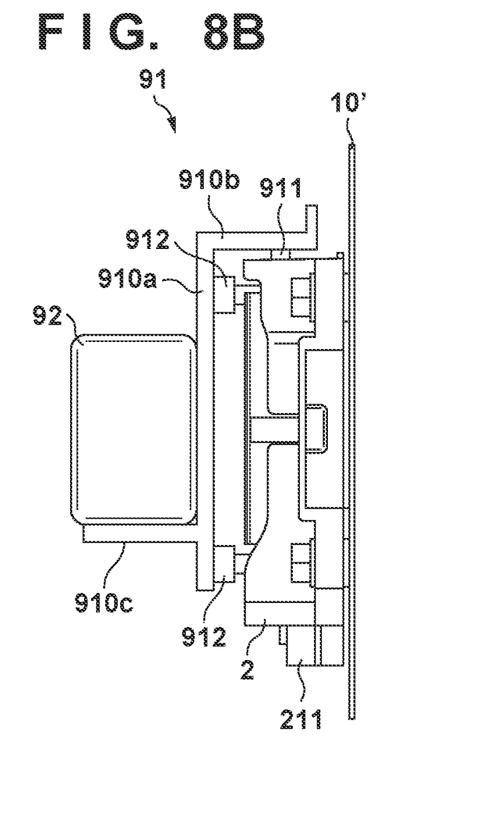
FIG. 8B is a view for explaining the mode of evaluation of the detection direction of the detection unit.

FIG. 8A is a perspective view showing a mode of evaluation of the detection direction of the detection unit 21, and FIG. 8B is a side view showing this mode. In this case, the detection apparatus 2 is installed on a predetermined part (to be referred to as a predetermined part 10') of the vehicle body 10, and an evaluation is performed in this state. An evaluation jig 91 and a level 92 are used in the evaluation described above. The jig 91 is formed so that it can be attached to an evaluation target (the detection apparatus 2 in this case) and can be equipped with the level 92. The level 92 directly measures the orientation of the jig 91, thereby indirectly allowing the orientation of the evaluation target to be evaluated.

As shown in FIG. 8B, the jig 91 includes base portion 910a, an extending portion 910b, a placement portion 910c, and abutting portions 911 and 912. The base portion 910a is a plate member extending in one direction (the vertical direction in this case). The extending portion 910b is a plate member extending from one end (the upper end in this case) of the base portion 910a in a direction (the horizontal direction in this case) perpendicular to the extending direction of the base portion 910a. The placement portion 910c is a plate member extending from the other end (the lower end in this case) of the base portion 910a in a direction opposite to the extending direction of the extending portion 910b. Each abutting portion 911 is a portion extending from the extending portion 910b in a direction (the lower direction in this case) perpendicular to the extending portion of the extending portion 910b. Each abutting portion 912 is a portion extending from the base portion 910a in the same direction as the extending direction of the extending portion 910b. Assume that the abutting portions 911 are arranged as a pair of left and right abutting portions and that the abutting portions 912 are arranged as a pair of upper and lower abutting portions in this embodiment.

Note that the above-described portions 910a, 910b, 910c, 911, and 912 may be formed integrally or some or all of the portions may be formed as separate portions.

The pair of left and right abutting portions 911 are inserted through the corresponding pair of opening portions OP3 and abut the reference surface F2 (a portion of the upper surface) of the detection unit 21. The pair of upper and lower abutting portions 912 abut against the upper and the lower end, respectively, of the detection surface F1 of the detection unit 21. In this case, the reference surface F2 is a surface which serves as a reference for specifying the detection direction of the detection unit 21, and the detection surface F1 is arranged so as to form a right angle with the reference surface F2 in this embodiment. Hence, the jig 91 can be said to be in a state that allows the orientation of the detection unit 21 to be measured by abutting against the reference surface F2 and the detection surface F1 via the abutting portions 911 and the abutting portions 912, respectively.

By placing the level 92 on the placement portion 910c of the jig 91 arranged in such a state, the orientation of the detection unit 21 can be evaluated based on the level 92, and the detection direction of the detection unit 21 can be evaluated as a result. In this embodiment, since the opening portions OP3 are provided in the upper side wall portion 2210U which is the upper-side portion of the side wall portions 2210W, the abutting portions 911 can be abutted against the detection apparatus from the upper side to allow the jig 91 to be attached comparatively easily and to prevent the attached jig 91 from falling.

In this embodiment, the pair of left and right abutting portions 911 can be abutted against the reference surface F2 appropriately by arranging the pair of opening portions OP3 on both sides of the pressing portion 223 of the upper side wall portion 2210U. It is preferable to provide at least two opening portions OP3, and the abutting portions 911 can be arranged in correspondence with the number of opening portions OP3 that have been provided. Additionally, the jig 91 can be abutted against the detection surface F1 appropriately by arranging the pair of upper and lower abutting portions 912. That is, according to this embodiment, this arrangement is advantageous in stabilizing the mode of attachment when the jig 91 is to be attached to the detection apparatus 2.

In addition, the side wall portions 2210W are formed so that the upper side wall portion 2210U on which the opening portions OP3 have been provided has a shape that protrudes more than the other wall portions (2210D, 2210L, and 2210R). This can suppress the strength of the side wall portions 2210W from degrading due to the arrangement of the opening portions OP3. This also applies in a similar manner to the strength degradation caused by the arrangement of the pressing portion 223.

According to the embodiment described above, it is possible to make the onboard detection apparatus 2 easy to handle for the user in various kinds of aspects. The detection apparatus 2 includes the detection unit 21 and the bracket 22 for attaching the detection unit 21 to the vehicle body 10. The detection unit 21 can be detached from/attached to the bracket 22 by pivoting about the end 2101 in a state in which the end 2101 is abutting against the end 2101.

As an aspect of the embodiment described above, the bracket 22 includes an opening portion OP2, and the opening portion OP2 exposes a portion of the back surface F1b of the detection unit 21 and the identifier 219 in a state in which the detection unit 21 is attached to the bracket 22. Since the identifier 219 is exposed by the opening portion OP2, the individual information of the detection unit 21 can be identified even in a state in which the detection unit 21 is attached to the bracket 22. In addition, the opening portion OP2 can be used to remove the detection unit 21 from the bracket 22. Hence, this embodiment allows the user to easily handle the detection apparatus 2.

As another aspect of the embodiment described above, the detection unit 21 includes, on its side surface, the reference surface F2 for specifying the detection direction. The bracket 22 includes the side wall portion 2210W which surrounds the side surface of the detection unit 21 and the opening portions OP3 which are arranged on the side wall portion 2210W so as to expose a portion of the reference surface F2. This kind of structure allows a plurality of pressing portions or locking portions (such as the pressing portion 223 and the like) to be arranged on the side wall portions 2210W and allows the detection unit 21 to be fixed firmly. In addition to this, it is also possible to abut the jig 91 against the reference surface F2 of the detection unit 21 via the opening portions OP3 as needed. For example, the detection direction of the detection unit 21 can be evaluated in a state in which the detection unit 21 is attached to the vehicle body 10. Hence, according to this embodiment, a detection apparatus that is easy to handle for the user can be implemented in this viewpoint as well.

Furthermore, as yet another aspect of the embodiment described above, in a state in which the bracket 22 is attached together with the detection unit 21 to the vehicle body 10, the detection unit 21 includes, on its lower end 2101, the connector portion 211 that can output a detection signal indicating the peripheral environment. The bracket 22 includes the pair of support portions 2211a and 2211b and the bridge portion 2212. The pair of support portions 2211a and 2211b supports the detection unit 21 from the lower side at both sides of the connector portion 211. The bridge portion 2212 is arranged astride the pair of support portions 2211a and 2211b so as not to interfere with the connector portion 211. This kind of structure can support the detection unit 21 appropriately by the arrangement of the pair of support portions 2211a and 2211b on both sides of the connector portion 211, and can suppress the reduction of the strength between the pair of the support portions 2211a and 2211b. Hence, according to this embodiment, a detection apparatus that is easy to handle for the user can be implemented in this viewpoint as well.

Several preferred modes according to the present invention have been exemplified above. However, the present invention is not limited to these modes and may be partially modified without departing from the scope of the invention. For example, other elements may be combined with the contents of the modes in accordance with the object, application purpose, and the like, and the contents of a certain mode may be combined with part of the contents of another mode. In addition, individual terms described in this specification are merely used for the purpose of explaining the present invention, and the present invention is not limited to the strict meanings of the terms and can also incorporate their equivalents.

The features of an aspect according to the embodiment described are summarized as follows:

The first mode relates to an onboard detection apparatus (for example, 2) and the detection apparatus is a detection apparatus that includes a detection unit (for example, 21) configured to detect a peripheral environment of a vehicle (for example, 1) and a bracket (for example, 22) configured to attach the detection unit to a vehicle body (for example, 10), wherein in a state in which the bracket is attached to the vehicle body with the detection unit, the detection unit includes, on a lower end portion, a connector portion (for example, 211) configured to be able to output a detection signal indicating the peripheral environment, and the bracket includes a pair of supporting portions (for example, 2211a and 2211b) configured to support the detection unit from the lower side on both sides of the connector portion and a bridge portion (for example, 2212) arranged astride the pair of supporting portions so as not to interfere with the connector portion. As a result, the detection unit can be supported by the pair of supporting portions arranged on both sides of the connector portion, and can suppress the degradation of the strength of the pair of the supporting portions. Hence, according to the first aspect, a detection apparatus that is easy to handle for the user can be implemented.

In the second mode, the bracket includes a storage portion (for example, 221) configured to store the detection unit, and the storage portions includes a bottom portion (for example, 2210B) which is positioned on the side of the vehicle body and side wall portions (for example, 2210U, 2210D, 2210L, 2210R, and 2210W) which extend from the bottom portion so as to surround the side surfaces of the detection unit, and the pair of supporting portions is a part of the side wall portion. As a result, the detection unit can be attached appropriately to the bracket, and the attachment of the detection unit to the vehicle body can be implemented by a comparatively simple arrangement.

In the third mode, the side wall portions include a first wall portion (for example, 2210L) and a second wall portion (for example, 2210R) that face each other in left and right directions and a third wall portion (for example, 2210U) and a fourth wall portion (for example, 2210D) that face each other in upper and lower directions, and the pair of supporting portions form one (for example, 2210D) of the third wall portion and the fourth wall portion which is set on the lower side. As a result, the detection unit can be fixed firmly by the side wall portions.

In the fourth mode, a pressing portion (for example, 223) configured to press down the detection unit from above is arranged in the other (for example, 2210U) of the third wall portion and the fourth wall portion. As a result, the detection unit can be fixed firmly by the side wall portions.

In the fifth mode, the bracket further includes a locking portion (for example, 224) arranged between the detection unit and each of the first wall portion and the second wall portion and configured to be able to lock the detection unit. As a result, the detection unit can be fixed firmly.

In the sixth mode, the bracket further includes an extending portion (for example, 2213) that extends from the bridge portion towards the upper side so as to restrict the movement of the detection unit in a direction apart from the bracket. As a result, it is possible to prevent a state in which the detection unit will fall due to a handling error when the detection unit is to be attached/detached.

The seventh mode relates to a vehicle (for example, 1) and the vehicle comprises a detection apparatus (for example, 2) as described above, and an electronic control unit (for example 3) configured to perform signal processing based on a detection signal from the detection apparatus. That is, the detection apparatus described above can be applied to various kinds of vehicles. Although a four-wheeled vehicle has been shown as a typical example of a vehicle in this embodiment, the detection apparatus described above can be applied to other various kinds of vehicles such as a straddle-type two-wheeled vehicle and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A detection apparatus that includes a detection unit configured to detect a peripheral environment of a vehicle and a bracket configured to attach the detection unit to a vehicle body,
    wherein in a state in which the bracket is attached to the vehicle body with the detection unit,
    the detection unit includes, on a lower end portion, a connector portion configured to be able to output a detection signal indicating the peripheral environment, and
    the bracket includes:
        a storage portion configured to store the detection unit, the storage portion including a bottom portion which is positioned on the side of the vehicle body and side wall portions which extend from the bottom portion so as to surround the side surfaces of the detection unit;
        a pair of supporting portions configured to support the detection unit from the lower side on both sides of the connector portion, the pair of supporting portions being a part of the side wall portions;
        a bridge portion arranged astride the pair of supporting portions so as not to interfere with the connector portion;

a locking portion, extending from the bottom portion, configured to lock the detection unit so as to restrict a movement of the detection unit in a first direction away from the bracket; and a biasing portion, formed in the bottom portion, configured to bias the detection unit in the first direction.

2. The apparatus according to claim 1, wherein the side wall portions include a first wall portion and a second wall portion that face each other in a left/right direction and a third wall portion and a fourth wall portion that face each other in an upper/lower direction, and the pair of supporting portions form one of the third wall portion and the fourth wall portion which is set on the lower side.

3. The apparatus according to claim 2, wherein a pressing portion configured to press down the detection unit from above is arranged in the other of the third wall portion and the fourth wall portion.

4. The apparatus according to claim 2, wherein the locking portion is arranged between the detection unit and each of the first wall portion and the second wall portion.

5. The apparatus according to claim 1, wherein the bracket further includes an extending portion that extends from the bridge portion towards the upper side so as to restrict the movement of the detection unit in a direction apart from the bracket.

6. A vehicle comprising:

a detection apparatus defined in claim 1; and an electronic control unit configured to perform signal processing based on a detection signal from the detection apparatus.

* * * * *